United States Patent [19]
Shahid et al.

[11] Patent Number: 5,519,798
[45] Date of Patent: May 21, 1996

[54] OPTICAL FIBER CONNECTOR INCLUDING V-GROOVE/PIN ALIGNMENT MEANS

[75] Inventors: Muhammed A. Shahid, Ewing Township, Mercer County; George J. Shevchuk, Old Bridge, both of N.J.

[73] Assignee: AT&T Corp., Murray Hill, N.J.

[21] Appl. No.: 290,272

[22] Filed: Aug. 15, 1994

[51] Int. Cl.$^6$ ................................................ G02B 6/38
[52] U.S. Cl. ........................ 385/65; 385/59; 385/60; 385/78; 385/82; 385/83; 385/64; 385/80
[58] Field of Search .......................... 385/59, 60, 64, 385/65, 71, 78, 80, 81, 82, 83, 97, 98, 99, 139, 52

[56] References Cited

U.S. PATENT DOCUMENTS

| | | | |
|---|---|---|---|
| 4,111,522 | 9/1978 | Auracher et al. | 385/65 |
| 4,818,058 | 4/1989 | Bonanni | 385/65 X |
| 4,818,059 | 4/1989 | Kakii et al. | 385/83 X |
| 4,836,638 | 6/1989 | Finzel | 385/65 X |
| 5,016,972 | 5/1991 | Schlaak | 385/65 |
| 5,082,346 | 1/1992 | Myers | 385/54 |
| 5,315,678 | 5/1994 | Maekawa et al. | 385/59 |
| 5,339,376 | 8/1994 | Kakii et al. | 385/71 |
| 5,351,328 | 9/1994 | Kakii et al. | 385/83 |
| 5,388,174 | 2/1995 | Roll et al. | 385/80 |

FOREIGN PATENT DOCUMENTS 1-293309A  11/1989  Japan ................ G02B 6/36

*Primary Examiner*—Brian Healy
*Attorney, Agent, or Firm*—Roderick B. Anderson; Lester H. Birnbaum

[57] ABSTRACT

The invention is an improved optical fiber connector of the type comprising two identical plastic support members (11) having therein at least one V-groove on a first surface. The two support members are identical, with the V-grooves (12) being adapted to clamp on opposite sides of an optical fiber (16). In one embodiment of the invention, each of the support members has integrated therein a first spring member (20). First and second alignment pins (17, 18) are located on opposite sides of the matched first and second support members (11). The spring member (20) of a first one of the support members bears against one of the alignment pins (18) and forces it against the first and second support members (11); and the other spring member (19) forces the other one of the alignment pins (17) against the first and second support members. The springs are both preferably leaf springs which extend in a direction parallel to the V-grooves. By integrating a spring member into each plastic support member, one avoids the need for applying a spring clip substantially surrounding the two support members.

18 Claims, 2 Drawing Sheets

# 5,519,798

OPTICAL FIBER CONNECTOR INCLUDING V-GROOVE/PIN ALIGNMENT MEANS

TECHNICAL FIELD

This invention relates to optical fiber connectors and, more particularly, connectors comprising plastic support members having V-grooves arranged on opposite sides of optical fibers.

BACKGROUND OF THE INVENTION

The Bonanni, U.S. Pat. No. 4,818,058, granted Apr. 4, 1989, incorporated herein by reference, describes an optical fiber connector comprising a pair of support members on opposite sides of an array of parallel optical fibers. The support members are made of monocrystalline silicon into which matching V-grooves have been formed by photolithographic masking and etching. The connector contains a pair of alignment pins which allows it to be joined to another identical connector to splice together two arrays of optical fibers, i.e., to abut the optical fibers with sufficient precision to allow optical energy to flow relatively unimpeded through the interconnection. The Bonanni device is successful because of the great precision with which V-grooves can be defined in monocrystalline silicon.

The copending application of Roll et al., Ser. No. 08/186,935, filed Jan. 27, 1994, now U.S. Pat. No. 5,388,174, incorporated herein by reference, describes how optical fiber connectors of the type described in the Bonanni patent can be mass-produced from plastic. The Roll et al. process uses the V-grooves etched in monocrystalline silicon to form a die portion, or insert, from which individual support members of the connector can be made by plastic injection molding. Making connector support members as described in the Roll et al. application not only avoids the need for individually masking and etching each support member, but it also allows for the provision of alignment and latching features, which cannot practically be provided in monocrystalline elements. These features in turn permit robotic handling of the support members so that pairs of support members can automatically be fitted on opposite sides of an array of optical fibers.

In both the Bonanni and Roll et al. optical fiber connectors, alignment pins must be held on opposite sides of each connector by a separate spring member, typically a spring clip surrounding the connector, which forces the alignment pins against reference surfaces on opposite sides of the connector. It would be desirable to reduce further the expense and complexity of optical fiber connectors and the convenience with which they can be mass-produced; specifically, it would be desirable to avoid the need for a separate spring clip.

SUMMARY OF THE INVENTION

The invention is an improved optical fiber connector of the type comprising two support members each having on a first surface at least one V-groove. The two support members are identical, with the V-grooves being adapted to clamp on opposite sides of an optical fiber. In accordance with one embodiment of the invention, each of the support members is of plastic and has integrated therein a spring member. First and second alignment pins are located on opposite sides of the matched first and second support members. The spring member of a first one of the support members bears against one of the alignment pins and forces it against one reference surface of the connector; and the spring member of the second support member forces the other one of the alignment pins against another reference surface of the connector comprising the first and second support members.

The springs are both preferably leaf springs which extend in a direction parallel to the V-grooves. By integrating a spring member into each plastic support members, one avoids the need for applying a spring clip substantially surrounding the two support members as is described in the Bonanni patent. Incorporating the spring members into the injection molding process for making the support members does not significantly add to the expense of the fabrication of the support members, and it significantly reduces the cost and complexity of assembling the optical fiber connectors.

These and other objects, features and benefits of the invention will be better understood from a consideration of the following detailed description taken in conjunction with the accompanying drawing.

DETAILED DESCRIPTION

Figure 1:
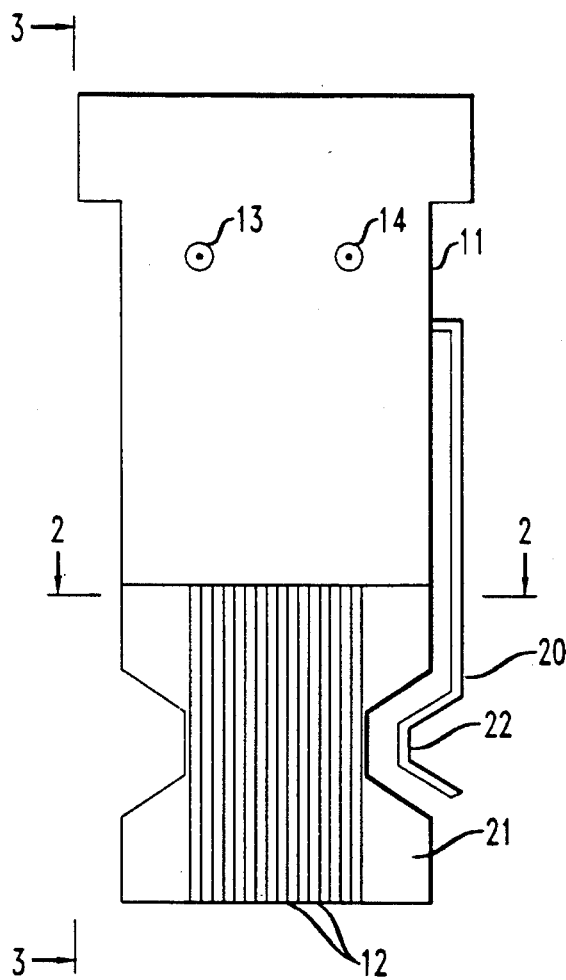
FIG. 1 is a top view of an optical fiber support member made in accordance with an illustrative embodiment of the invention.
Figure 2:
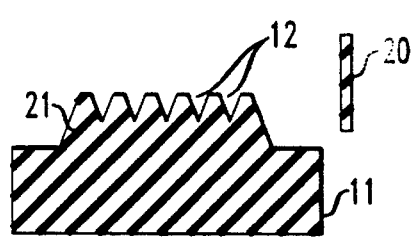
FIG. 2 is a view taken along lines 2—2 of FIG. 1.
Figure 3:
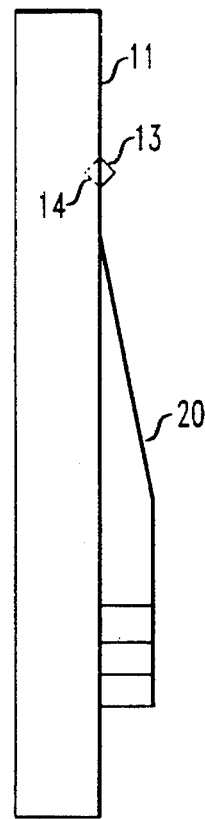
FIG. 3 is a view taken along lines 3—3 of FIG. 1.

The drawings are not necessarily to scale, with the dimensions in some cases being distorted to aid in clarity of exposition. Referring now to FIGS. 1–3, there is shown an optical fiber support member 11 of the general type described in the Roll et al. application. Defined on one surface of the support member are an array of parallel V-grooves 12. As described in detail in the Roll et al. application, the V-grooves 12 are made by using a master of photolithographically masked and etched monocrystalline silicon to make a metal insert containing V-grooves having the precision obtainable by semiconductor masking and etching. The metal insert is in turn used in plastic injection molding apparatus to define with equal precision the V-grooves 12. Because optical fiber support member 11 is made entirely of plastic, and by plastic injection molding, great numbers of identical optical fiber support members 11 can be mass-produced at low cost.

Figure 4:
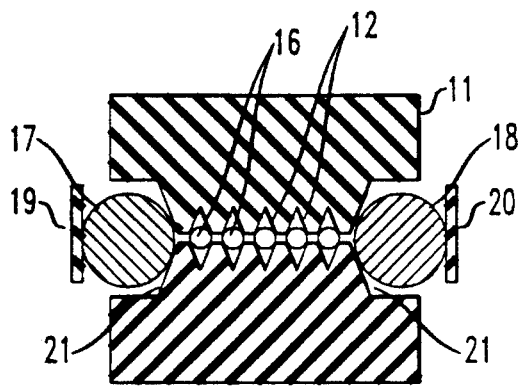
FIG. 4 is a sectional view of an optical fiber connector comprising two optical fiber support members of the type shown in FIG. 1.

Another advantage of making support element 11 by plastic injection molding is that an alignment projection 13 and alignment aperture 14 can easily be made in the plastic support member, whereas if such support member were made of monocrystalline silicon as described in the Bonanni patent, such alignment features could not practically be made. As shown in FIG. 3, the alignment projection 13 and the aperture 14 are preferably cone shaped. Thus, as shown in FIG. 4, when two identical optical fiber support members 11 are clamped on opposite sides of an optical fiber array comprising optical fibers 16, the alignment projection of one of the support members is fitted into the alignment aperture of the other support member.

As is described more fully in the Bonanni patent, the completed connector comprises the two support members 11 which hold optical fibers 16 between matching pairs of V-grooves 12. A pair of alignment pins 17 and 18 are pressed against reference surfaces 21 of the optical fiber support members 11 by spring members 19 and 20. As taught in the Bonanni patent, the alignment pins are generally cylindrical, with their locations being accurately referenced by the side reference surfaces 21 against which they bear. That is, the central axes of the alignment pins 17 and 18 are forced along a common plane with the central axes of optical fibers 16, and are displaced from the optical fibers by a prescribed distance. In the Bonanni patent, the springs 19 and 20 constitute part of a spring clip that surrounds both support elements 11.

Referring again to FIGS. 1 and 3, the need for a separate spring clip is avoided by integrating the spring 20 into the plastic support member 11. That is, spring 20, generally in the shape of a leaf spring which extends in a direction parallel to the V-grooves 12, is made of the same injection molded plastic that constitutes the remainder of support member 11. As shown in FIGS. 2 and 3, the spring member 20 extends above the surface of the major part of support member 11, with its center preferably at the same height as the upper surface of the V-grooves 12. Then, when two identical support members 11 are clamped on opposite sides of fibers 16, as shown in FIG. 4, the spring members 19 and 20 both are symmetrically located with respect to a line that joins the centers of all of the optical fibers 16. This exerts a force on the alignment pins 17 and 18 which is directed along that common center line.

Figure 5:
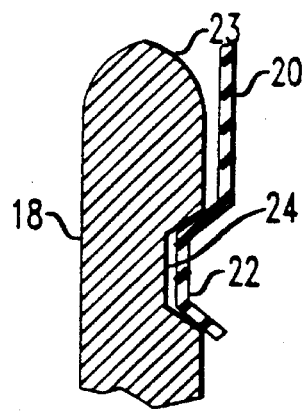
FIG. 5 is a sectional fragmentary detail showing how the spring member latches to an alignment pin of FIG. 4.

Referring to FIG. 1, the spring member 20 preferably has a portion 22 that projects inwardly as shown. Referring to FIG. 5, when an alignment pin 18 is inserted between the support elements 11 and the spring member 20, a cam surface 23 causes the spring member 20 to be deflected outwardly against the spring bias. Consequently, when the alignment pin is sufficiently inserted, the projection portion 22 falls into a detent 24 of the alignment pin. Detent 24 and projection portion 22 together constitute a latch which locks the alignment pin in place and prevents further axial movement of the pin. Consequently, the pin 18 constitutes a plug member of the connector shown in FIG. 4. The portion of the alignment pins 17 and 18 axially extending beyond the connector can then be inserted into another connector for the purpose of aligning the optical fibers 16 with a corresponding array of fibers contained by the other connector. Alternatively, the connector of FIG. 4 may constitute a socket into which alignment pins 17 and 18, extending from another connector, are inserted, for alignment of two optical fiber arrays.

As in the Bonanni patent, the alignment pins 17 and 18 are preferably of metal, such as steel, to give them rigidity and durability. When it is desired to remove the alignment pin 18, it is only necessary to rotate it to disengage the detent 24 from the projection portion 22 shown in FIG. 5. When that disengagement is made, the alignment pin can be axially withdrawn.

As described in the aforementioned Roll et al. application, the support members 11 are preferably made of filled polyphenylene sulfide which has a relatively low mold shrinkage. With this material, the dimensions of the silicon master should be approximately 0.4 percent greater than those of the final desired dimension to allow for a small shrinkage. The support members 11 are bonded together and the optical fibers 16 are bonded to the support members by any of various adhesives, such as Epo-Tek 353ND, commercially available from Epoxy Technology, Inc., Billerica, Mass., U.S.A., which has an appropriate viscosity for allowing transport along the grooves 12 by capillary action, as described in the Roll et al. application.

It can be appreciated from the foregoing that numerous identical support elements 11 may be mass-produced, with any pair of them being used to form together the connector shown in FIG. 4. Latch elements can be provided at opposite ends of the support members 11, as described in the Roll et al. application, for temporarily clamping together the two optical fiber support members 11, as shown in FIG. 4, until the adhesive bonding them together has hardened. Alternatively, conventional clamping arrangements can be used as the adhesive cures. Also, apertures can be included in the support members 11 as described in the Roll et al. application for applying the adhesive. The leaf spring configuration of the spring member 20 provides for reliable centrally directed forces against the alignment pins, but other spring configurations could also be devised which could be integrated via the plastic injection molding process.

While other configurations could be used, the leaf-spring configuration of spring member 20 is believed to give a deskable combination of reliability and durability. The spring member 20 may typically be one hundred fifty mils long and be deflected fifteen mils, to give a ratio of deflection to length of one to ten. Since the deflection ratio is small, the spring should be sufficiently durable to endure many deflections due to the insertion and withdrawal of alignment pins 17 and 18. Greater durability and spring force could be achieved by making the spring member 20 of metal, as shown in FIGS. 6 and 7.

Figure 6:
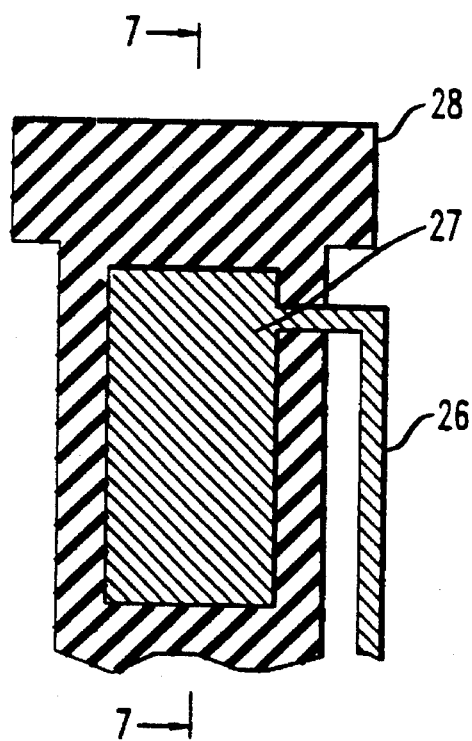
FIG. 6 is a sectional fragmentary view of an optical fiber support member in accordance with another embodiment of the invention.
Figure 7:
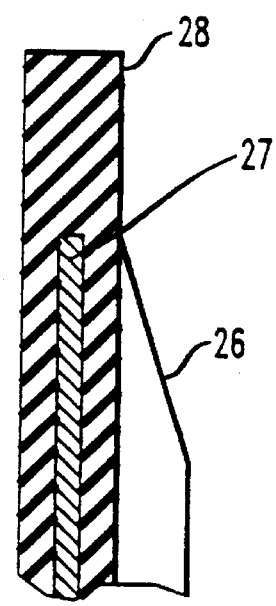
FIG. 7 is a view taken along liens 7—7 of FIG. 6.

The spring member 26 of FIGS. 6 and 7 is metal and is attached to, and unitary with, a metal plate portion 27. The plate portion 27 is embedded in the plastic support member 28 by an injection molding technique known as insert molding. That is, the plate portion 27 is included in the mold into which plastic is injected for forming the plastic support member 28, the fluid plastic flowing about and encasing plate portion 27. After the plastic has cured, it rigidly holds the plate portion 27 in place, which in turn anchors the spring member 26. The configuration of plate portion 27 distributes the stresses between the metal and the plastic to reduce the risk of fracture at the plastic-metal interface. Being of a metal such as steel, the spring member 26 can be repeatedly deflected without losing its spring bias and without breaking. While the use of this embodiment may somewhat complicate the molding process, as compared to the embodiment of FIG. 1, it can be easily implemented using techniques routinely used in the fabrication of dual in-line packages (DIPs) used for packaging integrated circuit devices. As is known from that industry, apparatus can be devised for automatically inserting plate portions 27 into a mold, if sufficient devices are to be mass-produced to justify such automatic equipment.

With the invention, one can fully realize the promise of the Roll et al. application; i.e., one can fully automate the assembly of optical fiber connectors. Advantages can, however, be obtained if the connectors are all or partly assembled manually. In preferred embodiments, more than five optical fibers would typically be supported by each connector; five were shown only for illustration. Of course, as few as one fiber could be used. Various other embodiments and modifications may be made by those skilled in the art without departing from the spirit and scope of the invention.

We claim:

1. An optical fiber connector comprising:

a first support member having integrated therein at least one V-groove in a first surface, and a first spring member adapted to exert a force against a side surface of said first support member:

the part of the first support member including the V-groove being substantially completely of plastic;

a second support member having integrated therein at least a second V-groove in a first surface and a second spring member, the second support member being substantially identical to the first support member;

the first and second V-grooves being adapted to bear against opposite sides of at least one optical fiber;

and first and second alignment pins on opposite sides of the first and second support members;

the first spring member forcing the first alignment pin against first side surfaces of the first and second support members, and the second spring member forcing the second alignment pin against second side surfaces of the first and second support members.

2. The connector of claim 1 wherein:

the first surfaces of the first and second support members each contain a plurality of V-grooves, the V-grooves adapted to bear against opposite sides of a plurality of optical fibers.

3. The connector of claim 2 wherein:

the first and second alignment pins contain latch portions which respectively latch to portions of the first and second spring members.

4. The connector of claim 2 wherein:

the V-grooves extend in a first direction;

and the spring members are leaf springs, each having one free end, each spring member extending in substantially said first direction.

5. The connector of claim 4 wherein:

the free ends of the spring members are both substantially symmetrical with respect to a line interconnecting the centers of the plurality of optical fibers.

6. The connector of claim 5 wherein:

the first and second support members are joined by an adhesive;

and the optical fibers are joined to the first and second members by an adhesive.

7. The connector of claim 4 wherein:

the side surfaces of each support member constitute reference surfaces, each transverse to the first surface, for alignment of the optical fibers;

each spring member is joined to a surface of the support member that is transverse to the first surface of such support member;

and each spring member forces an alignment pin against reference surfaces of the first and second support members.

8. The connector of claim 7 wherein:

the alignment pins extend in said first direction and are adapted to engage a second optical fiber connector for the purpose of aligning said plurality of optical fibers with a second plurality of optical fibers.

9. The connector of claim 8 wherein:

the first and second alignment pins contain latch portions which respectively latch to portions of the first and second spring members.

10. The connector of claim 9 wherein:

the free ends of the spring members are both substantially symmetrical with respect to a line interconnecting the centers of the plurality of optical fibers;

the first and second support members are joined by an adhesive;

and the optical fibers are joined to the first and second members by an adhesive.

11. The connector of claim 1 wherein:

the first and second support members, respectively including the first and second spring members thereof, are each composed substantially completely of a single body of plastic.

12. The optical fiber connector of claim 1 wherein:

the first and second spring members are respectively made of metal and each include a plate portion which is embedded in the plastic which constitutes the first and second support members, respectively.

13. An optical fiber supporting device comprising:

an array of grooves on a first surface of a support member, each groove adapted to support a separate optical fiber;

a second surface of the support member substantially transverse to the first surface;

a first portion of a spring member protruding from the second surface;

a second portion of said spring member extending in a direction generally parallel to said array of grooves;

a third portion of said spring member having a free end and protruding beyond the first surface;

said optical fiber support member being made predominantly of plastic with the grooves being formed in said plastic.

14. The optical fiber support member of claim 13 wherein:

the third portion of said spring member is adapted to bear against an alignment pin positioned between the spring member and reference surfaces of the support member and of a second support member.

15. The optical fiber supporting device of claim 14 wherein:

the third portion of the spring member contains a projecting portion adapted to project into a detent of the alignment pin.

16. The optical fiber supporting device of claim 13 wherein:

the support member and the spring member are part of a single body of plastic.

17. The supporting device of claim 13 wherein:

the spring member is made of metal, part of which is embedded in a plastic portion of the support member.

18. The optical fiber supporting device of claim 17 wherein:

the first portion of the spring member is attached to a plate portion of the spring member which is embedded within the plastic constituting a major part of the support member.

* * * * *